(12) United States Patent
Wu et al.

(10) Patent No.: US 11,292,805 B2
(45) Date of Patent: Apr. 5, 2022

(54) PREPARATION METHOD OF A CYCLIC PHOSPHONATE COMPOUND

(71) Applicant: GANNEX PHARMA CO., LTD., Shanghai (CN)

(72) Inventors: Jinzi Jason Wu, Shanghai (CN); Bailing Yang, Shanghai (CN); Bin Liang, Shanghai (CN)

(73) Assignee: GANNEX PHARMA CO., LTD., Shanghai (CN)

( * ) Notice: Subject to any disclaimer, the term of this patent is extended or adjusted under 35 U.S.C. 154(b) by 0 days.

(21) Appl. No.: 17/301,827

(22) Filed: Apr. 15, 2021

(65) Prior Publication Data
US 2021/0277039 A1  Sep. 9, 2021

(30) Foreign Application Priority Data

Feb. 18, 2020 (CN) .......................... 202010099272.7

(51) Int. Cl.
*C07F 9/6574* (2006.01)

(52) U.S. Cl.
CPC .............................. *C07F 9/65742* (2013.01)

(58) Field of Classification Search
CPC .................................................... C07F 9/65742
USPC ............................................................. 558/73
See application file for complete search history.

(56) References Cited

FOREIGN PATENT DOCUMENTS

WO  2006/128055 A2  11/2006

*Primary Examiner* — Kristin A Vajda
(74) *Attorney, Agent, or Firm* — Michael X. Ye; Rimon Law

(57) ABSTRACT

A method for preparing the cyclic phosphonate compound of Formula I

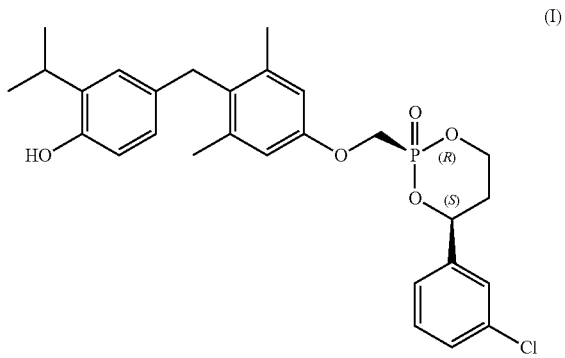

is described. The method significantly improves the stereoselectivity of the compound with the required configuration.

14 Claims, 1 Drawing Sheet

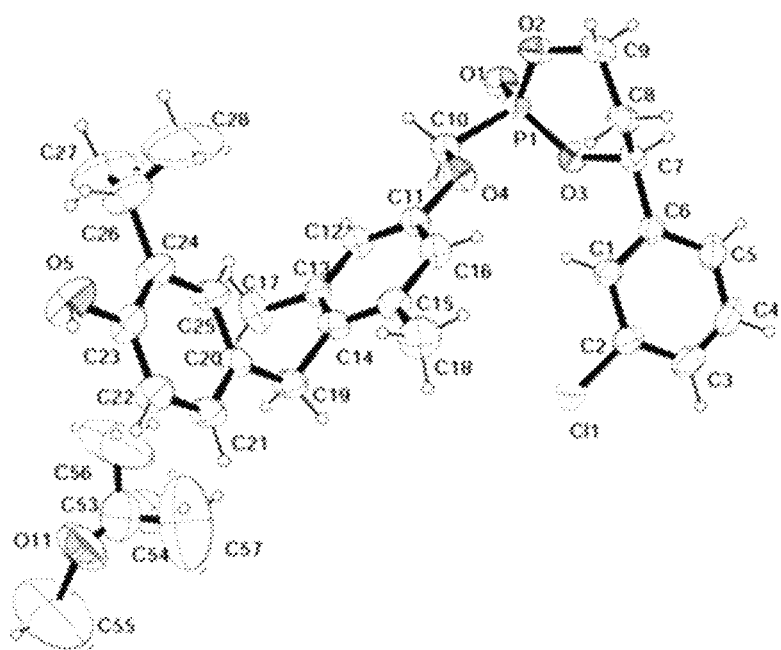

PREPARATION METHOD OF A CYCLIC PHOSPHONATE COMPOUND

RELATED APPLICATIONS

This application claims priority of Chinese Patent Application No. 202010099272.7, filed on Feb. 18, 2020, the entirety of which is hereby incorporated by reference.

FIELD

This application relates to the field of medicinal chemistry, in particular to a preparation method of a cyclic phosphonate compound.

BACKGROUND

The compound shown herein in Formula I (molecular formula: $C_{28}H_{32}ClO_5P$, molecular weight: 514.98, CAS: 852948-13-1) is a cyclic phosphonate compound.

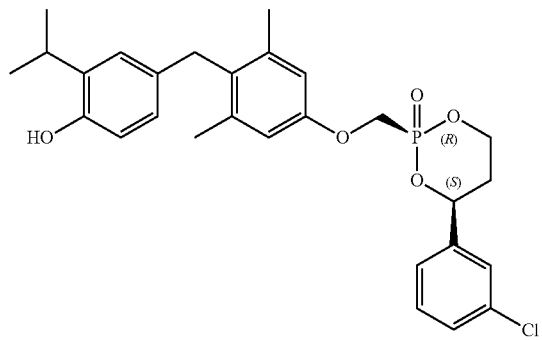

(I)

This compound is a new type of oral thyroid hormone β receptor agonist, which can effectively regulate the expression of downstream CYP7A and SREBP-1c by selectively activating THR-β, lowering LDL and triglyceride level, which in turn reduces fatty toxicity, improves liver function and reduces liver fat. Thus, this compound is a candidate drug for treatment of nonalcoholic steatohepatitis (NASH) with high efficiency and low toxicity.

WO2006128055 describes a synthesis method of cyclic phosphonate compounds, in which the corresponding phosphonic acid and propylene glycol compound are reacted in the presence of pyridine and condensing agent 1,3-dicyclohexylcarbodiimide. When preparing the compound shown in Formula I by this approach, because of the two chiral centers, the cis and trans configuration of the product are produced; however, the yield of the cis configuration is low.

Therefore, there is a need for a method of synthesis to improve the stereoselectivity and yield of the compounds of Formula I with the cis target configuration.

SUMMARY

The present application provides a method of synthesis for a cyclic phosphonate compound shown in Formula I,

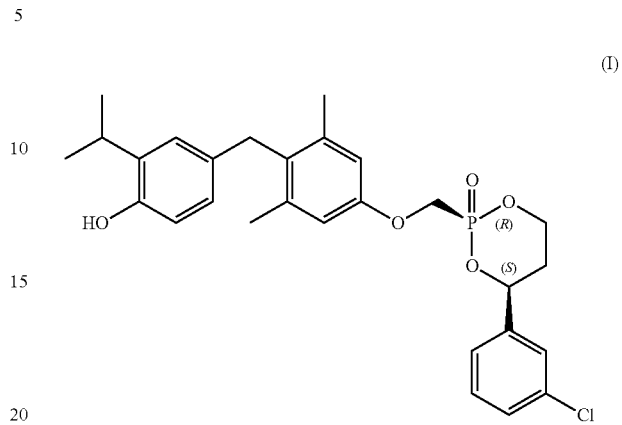

(I)

which can improve the stereoselectivity and yield of the target compound shown in Formula I with required stereospecific configuration.

In some embodiments, the method comprises the steps of:
(1) reacting a compound of Formula 9 with a chlorinating agent to obtain a phosphonyl chloride intermediate of Formula 11,

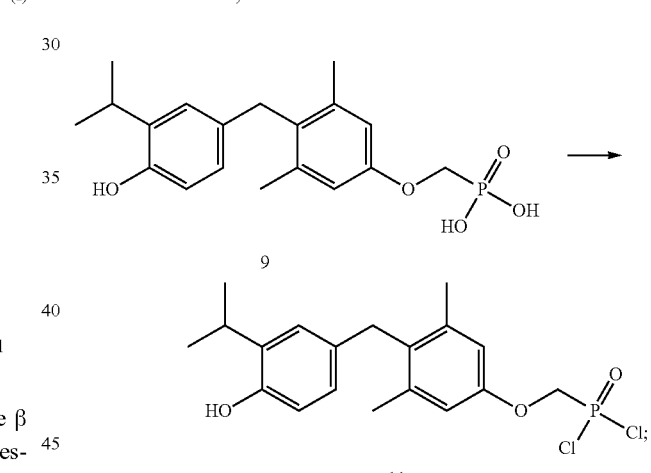

and dissolving the phosphonyl chloride intermediate of Formula 11 in a first organic solvent to form a solution of Formula 11;
(2) dissolving a compound of Formula 10 in a second organic solvent to form a solution of Formula 10

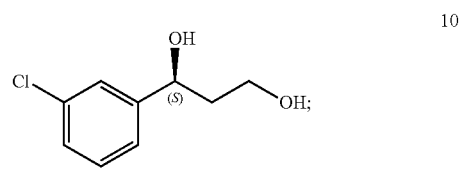

10 adding sequentially a Lewis acid and then an alkali to the solution of Formula 10 to form a reaction solution, wherein the Lewis acid is selected from the group consisting of $TiCl_4$, $SnCl_4$, $FeCl_3$ and combinations thereof, and (3) adding the reaction solution of step (2) into the solution of Formula 11 to produce the cyclic phosphonate compound of Formula I.

BRIEF DESCRIPTION OF THE DRAWINGS

The present invention will be described in detail with reference FIGURES, in which:

FIG. 1 shows the X-ray crystal structure of the compound of Formula I.

While the present disclosure will now be described in detail, and it is done so in connection with the illustrative embodiments, it is not limited by the particular embodiments illustrated in the figures and the appended claims.

DETAILED DESCRIPTION

Reference will be made in detail to certain aspects and exemplary embodiments of the application, illustrating examples in the accompanying structures and FIGURES. The aspects of the application will be described in conjunction with the exemplary embodiments, including methods, materials and examples, such description is non-limiting and the scope of the application is intended to encompass all equivalents, alternatives, and modifications, either generally known, or incorporated here. Unless otherwise defined, all technical and scientific terms used herein have the same meaning as commonly understood by one of ordinary skill in the art to which this application belongs. One of skill in the art will recognize many techniques and materials similar or equivalent to those described here, which could be used in the practice of the aspects and embodiments of the present application. The described aspects and embodiments of the application are not limited to the methods and materials described.

Method of Synthesis

An aspect of this application is to provide an improved method for synthesizing cyclic phosphonate compound shown in Formula I:

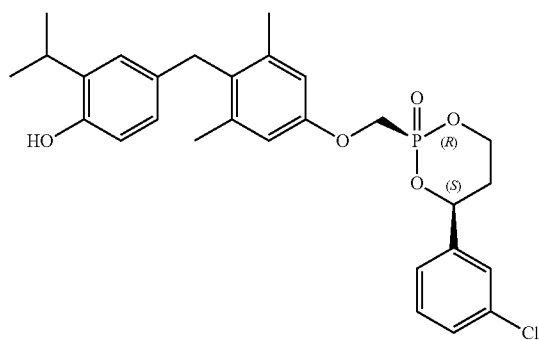

The inventors unexpectedly discovered a process of preparing the cyclic phosphonate compound of Formula I. Specifically, the phosphonic acid compound shown in Formula 9 was firstly converted into phosphonyl chloride intermediate shown in Formula 11, and then reacted with the propylene glycol compound shown in Formula 10 in the presence of a Lewis acid and a base to form the compound of Formula I. The method improves the stereoselectivity and yield of the target compound shown in Formula I with a desired stereospecific configuration.

In some embodiments, the Lewis acid comprises TiCl$_4$, SnCl$_4$, FeCl$_3$ or combinations thereof and the base is an organic base, such as triethylamine (TEA), which significantly improves the stereoselectivity and the reaction yield of the target compound shown in Formula I.

Synthesis Steps

In some embodiments, the synthesis method of the present application comprises the following steps:

(1) Reacting the compound shown in Formula 9 with a chlorinating agent to obtain a phosphonyl chloride intermediate of Formula 11, which is then dissolved in an organic solvent to form a solution of Formula 11 for later use:

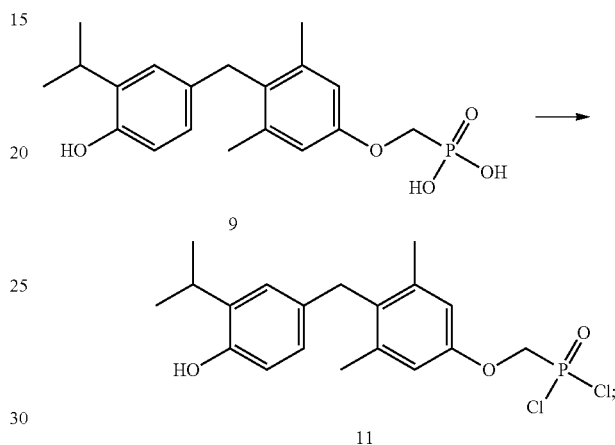

(2) Separately, dissolving the compound shown in Formula 10

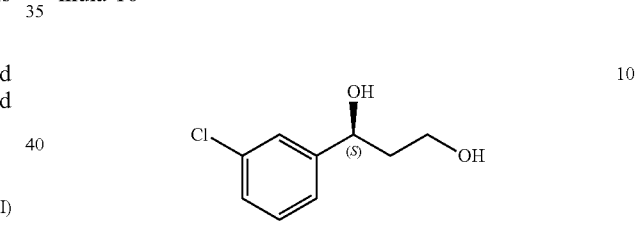

in an organic solvent; adding one or more Lewis acids, and a base to the dissolved compound of Formula 10 to form a reaction solution; and (3) adding the reaction solution to the solution of the phosphonyl chloride intermediate 11 prepared in step (1) to obtain the cyclic phosphonate compound of Formula I.

Chlorinating Agent

The chlorinating agent may be, for example, chlorine, HCl, CCl$_4$, CaCl$_2$, NaCl, MgCl$_2$, FeCl$_3$. Other examples of chlorinating agents include, but are not limited to carbon tetrachloride, hexachloroacetone, chloroform, hexachloroethane, phosgene, thionyl chloride, sulfuryl chloride, trichloromethylbenzene, perchlorinated alkylaryl functional groups, or organic and inorganic hypochlorites, including hypochlorous acid, and t-butylhypochlorite, methylhypochlorite, chlorinated amines (chloramine), chlorinated amides and chlorinated ulfonamides. In some embodiments, the chlorinating agent comprises thionyl chloride, oxalyl chloride and/or triphosgene.

In some embodiments, the compound of Formula 9 reacted with the chlorinating agent in the presence of N,N-dimethylformamide. In some embodiments, the compound of Formula 9 reacted with the chlorinating agent in the presence of a polar aprotic solvent, such as 1,2-dimethoxyethane, dimethyl acetamide, and 1-3 dioxolane. In some embodiments, the compound of Formula 9 reacted with the chlorinating agent in the presence of other organic solvents as listed herein.

Organic Solvents

In certain embodiments, the organic solvent in step (1) or (2) is methylene chloride, 1,2-dichloroethane and/or tetrahydrofuran. In some embodiments, the organic solvent is selected from the group consisting of N-methyl-2-pyrrolidone, benzyl alcohol, dibasic esters, methyl acetate, dimethyl sulfoxide (DMSO), thiophene, 1,3-dioxolane, 2-methyltetrahydrofuran, cyclopentyl methyl ether, 2,2,5,5-tetramethyloxolane, 2,5-dimethyltetrahydrofuran, pinacolone, fluorobenzene, trifluorotoluene, acetonitrile, diphenylether, nitrobenzene, thionyl chloride, cyclohexane, propylene carbonate, teralin, hexamethyldisiloxane, acetic acid, ethyl acetate, methyl acetate, acetone, methanol, eptane, methyl tert-butyl ether, methyl isobutyl ketone, ethoxyethanol, hexafluoro isopropanol, hexamethyldisiloxane, hexafluoroisopropanol, supercritical carbon dioxide, 1,2-difluorobenzene, orthodichlorobenzene, triglyme, cyrene, gamma-valerolactone, pyridine hydrochloride, trifluoroethanol and 1-methoxy-2-propanol.

Lewis Acids

In some embodiments, the Lewis acid is $TiCl_4$, $SnCl_4$, $FeCl_3$ or mixtures thereof. It has been discovered that certain Lewis acids, such as $AlCl_3$, result in lower yield of the compound of Formula I.

Organic Base

In certain embodiments, the base is an organic base. In a particular embodiment, the organic base is trimethylamine. In other embodiments, the organic base is selected from the group consisting of diethanolamine, trimethylamine, pyridine, alkanamines, methylamine, imidazole, benzimidazole, histidine, guanidine, phosphazene bases, hydroxides of quaternary ammonium cations, organic cations, tetramethylammonium hydroxide, tetrabutylammonium hydroxide, choline hydroxide, organolithiums, Grignard reagents, amines, N-heterocyclic compounds, tetraalkylammonium, phosphonium hydroxides, metal alkoxides, metal amides, and metal silanoates.

Molar Ratios

In some embodiments, the chlorinating agent comprises thionyl chloride, oxalyl chloride and/or triphosgene, and the molar ratio of the chlorinating agent to the compound of Formula 9 in step (1) is in the range of 0.2:1 to 50:1, 0.2:1 to 20:1, 0.2:1 to 10:1, 0.2:1 to 5:1, 0.2:1 to 2:1, 0.2:1 to 1:1, 0.2:1 to 0.5:1, 0.5:1 to 50:1, 0.5:1 to 20:1, 0.5:1 to 10:1, 0.5:1 to 5:1, 0.5:1 to 2:1, 0.5:1 to 1:1, 1:1 to 50:1, 1:1 to 20:1, 1:1 to 10:1, 1:1 to 5:1, 1:1 to 2:1, 2:1 to 50:1, 0:1 to 20:1, 2:1 to 10:1, 2:1 to 8:1, 2:1 to 5:1, 3:1 to 4:1, 5:1 to 50:1, 5:1 to 20:1, 5:1 to 10:1, 10:1 to 50:1, 10:1 to 20:1 or 20:1 to 50:1. In some embodiments, the chlorinating agent to the compound of Formula 9 in step (1) is in the range of 1:1 to 8:1, 2:1 to 7:1, 3:1 to 6:1 or 4:1 to 5:1. In some embodiments, the chlorinating agent to the compound of Formula 9 in step (1) is 4.4:1.

In some embodiments, the molar ratio of the compound of Formula 10 to the compound of Formula 9 in step (2) is 0.1:1 to 10:1, 0.1:1 to 3:1, 0.1:1 to 1:1, 0.1:1 to 0.3:1, 0.3:1 to 10:1, 0.3:1 to 3:1, 0.3:1 to 2:1, 0.3:1 to 1.5:1, 0.3:1 to 1.2:1, 0.3:1 to 1:1, 1:1 to 10:1, 1:1 to 3:1, 1:1 to 2:1, 1:1 to 1.5:1, 1:1 to 1.3:1, 1.5:1 to 10:1, 1.5:1 to 3:1, 0.8:1 to 1.2:1, or 0.8:1 to 1.5:1. In some embodiments, the molar ratio of the compound of Formula 10 to the compound of Formula 9 in step (2) is 0.9:1 to 1.5:1, 1:1 to 1.4:1 or 1.1:1 to 1.3:1. In some embodiments, the molar ratio of the compound of Formula 10 to the compound of Formula 9 in step (2) is 1.2:1.

In some embodiments, the molar ratio of the Lewis acid to the compound of Formula 10 in step (2) is 0.1:1 to 20:1, 0.1:1 to 10:1, 0.1:1 to 3:1, 0.1:1 to 2:1, 0.1:1 to 1:1, 0.1:1 to 0.3:1, 0.3:1 to 20:1, 0.3:1 to 10:1, 0.3:1 to 3:1, 0.3:1 to 2:1, 0.3:1 to 1:1, 1:1 to 20:1, 1:1 to 10:1, 1:1 to 3:1, 1:1 to 2:1, 1:1 to 1.5:1, 2:1 to 20:1, 2:1 to 10:1, 2:1 to 3:1, 3:1 to 20:1, 3:1 to 10:1 or 10:1 to 20:1. In some embodiments, the molar ratio of the Lewis acid to the compound of Formula 10 in step (2) is 0.5:1 to 1.5:1, 0.7:1 to 1.3:1 or 0.9:1 to 1.1:1. In some embodiments, the molar ratio of the Lewis acid to the compound of Formula 10 in step (2) is 1:1.

In some embodiments, the base is trimethylamine and the molar ratio of triethylamine to the compound of Formula 10 in step (2) is 0.3:1 to 40:1, 0.3:1 to 20:1, 0.3:1 to 15:1, 0.3:1 to 10:1, 0.3:1 to 8:1, 0.3:1 to 5:1, 0.3:1 to 3:1, 0.3:1 to 1:1, 1:1 to 40:1, 1:1 to 20:1, 1:1 to 15:1, 1:1 to 10:1, 1:1 to 8:1, 1:1 to 5:1, 1:1 to 3:1, 1.5:1 to 40:1, 1.5:1 to 20:1, 1.5:1 to 15:1, 1.5:1 to 10:1, 1.5:1 to 8:1, 1.5:1 to 5:1, 1.5:1 to 3:1, 3:1 to 40:1, 3:1 to 20:1, 3:1 to 15:1, 3:1 to 10:1, 3:1 to 8:1, 3:1 to 5:1, 5:1 to 40:1, 5:1 to 20:1, 5:1 to 15:1, 5:1 to 10:1, 5:1 to 8:1, 8:1 to 40:1, 8:1 to 20:1, 8:1 to 15:1, 8:1 to 10:1, 10:1 to 40:1, 10:1 to 20:1, 10:1 to 15:1, 15:1 to 40:1, 15:1 to 20:1 or 20:1 to 40:1. In some embodiments, the base is trimethylamine and the molar ratio of triethylamine to the compound of Formula 10 in step (2) is 0.5:1 to 4:1 or 1.5:1 to 2.5:1. In some embodiments, the base is trimethylamine and the molar ratio of triethylamine to the compound of Formula 10 in step (2) is 2:1.

In some embodiments, the compound of Formula 9 reacts with the chlorinating agent in the presence of N,N-dimethylformamide in step (1). In some embodiments, the molar ratio of N,N-dimethylformamide to the compound of Formula 9 is 0.002:1 to 5:1, 0.002:1 to 2:1, 0.002:1 to 1:1, 0.002:1 to 0.5:1, 0.002:1 to 0.2:1, 0.002:1 to 0.1:1, 0.002:1 to 0.05:1, 0.002:1 to 0.02:1, 0.002:1 to 0.01:1, 0.002:1 to 0.005:1, 0.005:1 to 5:1, 0.005:1 to 2:1, 0.005:1 to 1:1, 0.005:1 to 0.5:1, 0.005:1 to 0.2:1, 0.005:1 to 0.1:1, 0.005:1 to 0.05:1, 0.005:1 to 0.02:1, 0.005:1 to 0.01:1, 0.01:1 to 5:1, 0.01:1 to 2:1, 0.01:1 to 1:1, 0.01:1 to 0.5:1, 0.01:1 to 0.2:1, 0.01:1 to 0.1:1, 0.01:1 to 0.05:1, 0.01:1 to 0.02:1, 0.02:1 to 5:1, 0.02:1 to 2:1, 0.02:1 to 1:1, 0.02:1 to 0.5:1, 0.02:1 to 0.2:1, 0.02:1 to 0.1:1, 0.02:1 to 0.05:1, 0.05:1 to 5:1, 0.05:1 to 2:1, 0.05:1 to 1:1, 0.05:1 to 0.5:1, 0.05:1 to 0.2:1, 0.05:1 to 0.1:1, 0.1:1 to 5:1, 0.1:1 to 2:1, 0.1:1 to 1:1, 0.1:1 to 0.5:1, 0.1:1 to 0.2:1, 0.2:1 to 5:1, 0.2:1 to 2:1, 0.2:1 to 1:1, 0.2:1 to 0.5:1, 0.5:1 to 5:1, 0.5:1 to 2:1, 0.5:1 to 1:1, 1:1 to 5:1, 1:1 to 2:1 or 2:1 to 5:1. In some embodiments, the molar ratio of N,N-dimethylformamide to the compound of Formula 9 is 0.01:1 to 0.07:1, 0.02:1 to 0.06:1 or 0.03:1 to 0.05:1. In some embodiments, the molar ratio of N,N-dimethylformamide to the compound of Formula 9 is 0.04:1.

Temperature Ranges

In certain embodiments, the chlorinating agent is dripped into the compound of Formula 9 at 5-40° C., 5-35° C., 5-30° C., 5-25° C., 5-20° C., 5-15° C., 5-10° C., 10-40° C., 10-35° C., 10-30° C., 10-25° C., 10-20° C., 10-15° C., 15-40° C., 15-35° C., 15-30° C., 15-25° C., 15-20° C., 20-40° C., 20-35° C., 20-30° C., 25-30° C., 30-40° C. or 35-40° C. In certain embodiments, the chlorinating agent is dripped into the compound of Formula 9 at 10-30° C.

In certain embodiments, after the chlorinating agent is dripped into the compound of Formula 9, the reaction is carried out at 25-95° C. In some embodiments, the chlorinating agent may be dripped into the compound of Formula 9 at temperature ranges of 25-40° C., 25-45° C., 25-50° C., 25-55° C., 25-60° C., 25-65° C., 25-70° C., 25-75° C., 25-80° C., 25-85° C., 25-90° C., 30-40° C., 30-45° C., 30-50° C., 30-55° C., 30-60° C., 30-65° C., 30-70° C., 30-75° C., 30-80° C., 30-85° C., 30-90° C., 30-95° C., 35-40° C., 35-45° C., 35-50° C., 35-60° C., 35-65° C., 35-70° C., 30-75° C., 35-80° C., 30-85° C., 35-90° C., 35-95° C., 40-45° C., 40-50° C., 40-55° C., 40-60° C., 40-65° C., 40-70° C., 40-75° C., 40-80° C., 40-85° C., 40-90° C., 40-95° C., 45-50° C., 45-55° C., 45-60° C., 45-65° C., 45-70° C., 45-75° C., 45-75° C., 45-85° C., 45-90° C., 45-95° C., 50-55° C., 50-60° C., 50-65° C., 50-70° C., 50-75° C., 50-80° C., 50-85° C., 50-90° C., 50-95° C., 55-60° C., 55-65° C., 55-70° C., 55-75° C., 55-80° C., 55-85° C., 55-90° C., 55-95° C., 60-65° C., 60-70° C., 60-75° C., 60-80° C., 60-85° C., 60-90° C., 60-95° C., 65-70° C., 65-75° C., 65-80° C., 65-85° C., 65-90° C., 65-95° C., 70-75° C., 70-80° C., 70-85° C., 70-90° C., 70-95° C., 75-80° C., 75-85° C. 75-90° C., 75-95° C., 80-85° C., 80-90° C., 80-95° C., 85-90° C., 85-95° C. or 90-95° C. In certain embodiments, after the chlorinating agent is dripped into the compound of Formula 9, the reaction is carried out at 35-45° C.

In some embodiments, the Lewis acid is added dropwise at −20 to 25° C. in step (2). In certain embodiments, the Lewis acid is added at a temperature in the range of −20 to 20° C., −20 to 15° C., −20 to 10° C., −20 to 5° C., −20 to 0° C., −20 to −5° C., −20 to −10° C., −20 to −15° C., −15 to 25° C., −15 to 20° C., −15 to 15° C., −15 to 10° C., −15 to 5° C., −15 to 0° C., −15 to −5° C., −15 to −10° C., −10 to 25° C., −10 to 20° C., −10 to 15° C., −10 to 10° C., −10 to 5° C., −10 to 0° C., −10 to −5° C., −5 to 25° C., −5 to 20° C., −5 to 15° C., −5 to 10° C., −5 to 5° C., −5 to 0° C., 0 to 25° C., 0 to 20° C., 0 to 15° C., 0 to 10° C., 0 to 5° C., 5 to 25° C., 5 to 20° C., 5 to 15° C., 5 to 10° C., 10 to 25° C., 10 to 20° C., 10 to 15° C., 15 to 25° C., 15 to 20° C. or 20 to 25° C. In some embodiments, the Lewis acid is added dropwise at −15 to −5° C.

In some embodiments, the alkali is added dropwise at −30 to 20° C. in step (2). In some embodiments, the alkali is added dropwise at a temperature in the range of −30 to 15° C., −30 to 10° C., −30 to 5° C., −30 to 0° C., −30 to −5° C., −30 to −10° C., −30 to −15° C., −30 to −20° C., −30 to −25° C., −25 to 20° C., −25 to 15° C., −25 to 10° C., −25 to 5° C., −25 to 0° C., −25 to −5° C., −25 to −10° C., −25 to −15° C., −25 to −20° C., −20 to 20° C., −20 to 15° C., −20 to 10° C., −20 to 5° C., −20 to 0° C., −20 to −5° C., −20 to −10° C., −20 to −15° C., −15 to 20° C., −15 to 15° C., −15 to 10° C., −15 to 5° C., −15 to 0° C., −15 to −5° C., −15 to −10° C., −10 to 20° C., −10 to 15° C., −10 to 10° C., −10 to 5° C., −10 to 0° C., −10 to −5° C., −5 to 20° C., −5 to 15° C., −5 to 10° C., −5 to 5° C., −5 to 0° C., 0 to 20° C., 0 to 15° C., 0 to 10° C., 0 to 5° C., 5 to 20° C., 5 to 15° C., 5 to 10° C., 10 to 20° C., 10 to 15° C. or 15 to 20° C. In some embodiments, the alkali is added dropwise at −15 to −5° C. in step (2).

In certain embodiments, the alkali is added at temperatures in the range of, for example, −25-10° C., −20~10° C., −18-10° C., −16-10° C., −14-10° C., −12-10° C., −10-10° C., −8-10° C., −6-10° C., −4-10° C., −2-10° C., 0-10° C., 2-10° C., 4-10° C., 6-10° C., 8-10° C., −15-10° C., −13-10° C., −11-10° C., −9-10° C., −7-10° C., −5-10° C., −3-10° C., −1-10° C., 1-10° C., 3-10° C., 5-10° C., 7-10° C., 9-10° C., 9-12° C., and 9-14° C. In some embodiments, the alkali is added dropwise at −20 to 10° C. In certain embodiments, the alkali may be, for example, sodium hydroxide (NaOH), potassium hydroxide (KOH), calcium hydroxide (Ca(OH)$_2$), and aqueous ammonia, NH$_3$ (aq).

In some embodiments, the reaction solution of step (2) is added dropwise to the solution of Formula 11 from step (1) at a temperature in the range of −70 to 10° C., −70 to 0° C., −70 to −10° C., −70 to −20° C., −70 to −30° C., −70 to −40° C., −70 to −50° C., −70 to −60° C., −60 to 10° C., −60 to 0° C., −60 to −10° C., −60 to −20° C., −60 to −30° C., −60 to −40° C., −60 to −50° C., −50 to 10° C., −50 to 0° C., −50 to −10° C., −50 to −20° C., −50 to −30° C., −50 to −40° C., −40 to 10° C., −40 to 0° C., −40 to −10° C., −40 to −20° C., −40 to −30° C., −30 to 10° C., −30 to 0° C., −30 to −10° C., −30 to −20° C., −20 to 10° C., −20 to 0° C., −20 to −10° C., −10 to 10° C., −10 to 0° C., 0 to 20° C., 0 to 10° C. or 10 to 20° C. In some embodiments, the reaction solution of step (2) is added dropwise to the solution of Formula 11 from step (1) at a temperature in the range of −60° C. to −35° C.

In some embodiments, the reaction solution of step (2) is added dropwise to the solution of Formula 11 from step (1) at a temperature in the range of −50 to 0° C. In certain embodiments, the reaction solution is added dropwise to the solution Formula 11 at a temperature in the range of −40 to −30° C., and reacted at a temperature in the range of −60 to −40° C.

The inventor unexpectedly discovered that the stereoselectivity of the target compound with the required configuration and yield can be greatly improved with dropping the reaction solution at −40 to −30° C. and carrying out the reaction at −40 to −30° C.

Reaction Time

In some embodiments, the compound of Formula 9 is reacted with the chlorinating agent for a period of 1-24, 1-20, 1-16, 1-12, 1-8, 1-4, 1-2, 2-24, 2-20, 2-16, 2-12, 2-8, 2-4, 4-24, 4-20, 4-16, 4-12, 4-8, 8-24, 8-20, 8-16, 8-12, 12-24, 12-20, 12-16, 16-24, 16-20 or 20-24 hrs. In some embodiments, the compound of Formula 9 is reacted with the chlorinating agent overnight.

In particular embodiments, the mixture in step (2) is stirred for 5-300 minutes after adding the Lewis acid and the alkali. In certain embodiments, the mixture is stirred for a period of 5-10, 5-30, 5-60, 5-90, 5-120, 5-150, 5-180, 5-240, 5-300, 10-30, 10-60, 10-90, 10-120, 10-180, 10-240, 10-300, 30-60, 30-90, 30-120, 30-150, 30-180, 30-240, 30-300, 60-90, 60-120, 60-150, 60-180, 60-240, 60-300, 90-120, 90-150, 90-180, 90-240, 90-300, 120-150, 120-180, 120-240, 120-300, 150-180, 150-240, 150-300, 180-240, 180-300 or 240-300 min. In particular embodiments, the mixture is stirred for 60-150 min after adding the Lewis acid and the alkali.

The present application is further illustrated by the following examples that should not be construed as limiting. The contents of all references, patents, and published patent applications cited throughout this application, as well as the Figures and Tables, are incorporated herein by reference.

EXAMPLES
Example 1
Synthesis of Compounds of Formula 9
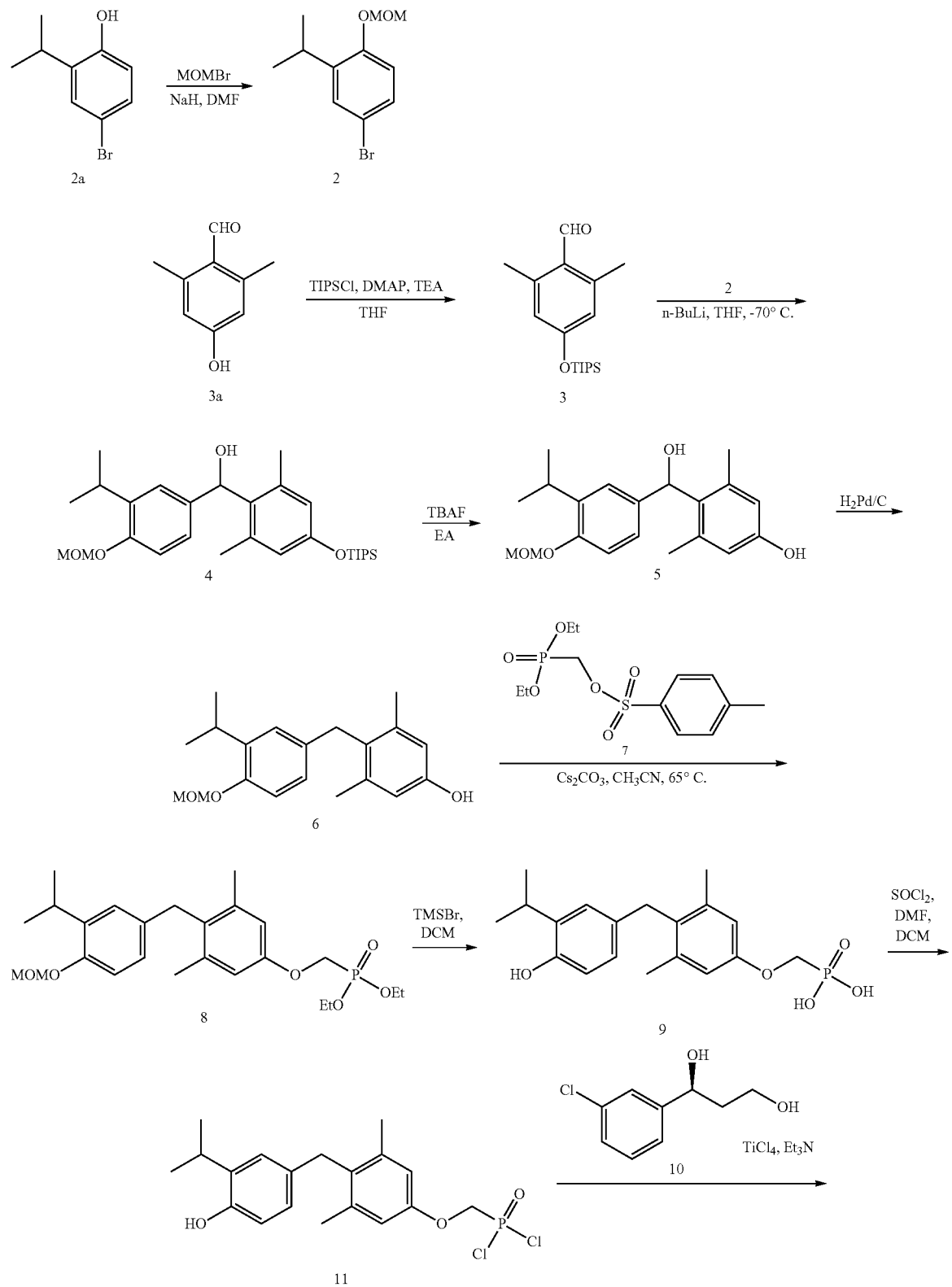

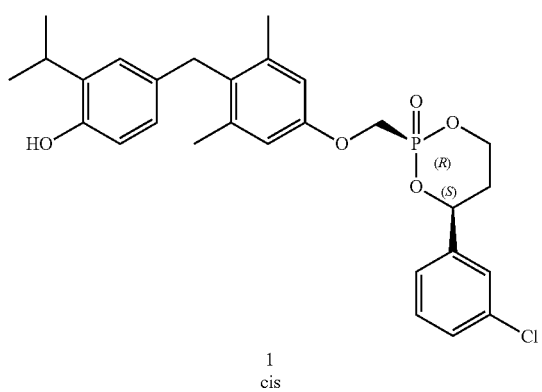
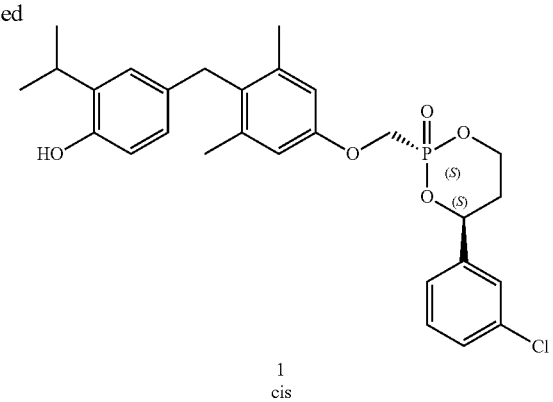

Synthesis of Compounds of Formula 2

Dissolve the compound of Formula 2a (40 g) in DMF (300 mL), cool to 0~5° C., 9.3 g NaH (60%) was added in batches, stir for 20 min. Then bromomethyl ether (MOMBr) (17.5 g) was added dropwisely, and stirred at room temperature for 2 h. The reaction was monitored by thin layer chromatograph (TLC). After completion, 300 ml of water was added dropwise to quench the reaction. Then, 300 mL of ethyl acetate was added for extraction. The organic phase was concentrated to dryness to obtain the compound of Formula 2 (42.0 g) as oil.

Synthesis of Compounds of Formula 3

Dissolve the compound of Formula 3a (100 g), triethylamine (74.3 g) and DMAP (4.2 g) in 500 mL THF, drop triisopropyl chlorosilane (TIPSCl) (105.5 g) at 0~10° C. Then stirred at room temperature for 2 h. The reaction was monitored by TLC. After completion, 500 mL of water and 500 mL of dichloromethane were added, the organic phase was extracted, and concentrated to dryness to five the title compound of Formula 3 (150 g) as an oil.

Synthesis of Compounds of Formula 4

Compound of formula 2 (4.7 g) was dissolved in anhydrous THF (46 mL), cooled to −70° C. n-BuLi (7.2 mL, 2.5M THF solution) was added dropwise and stirred at −70° C. for 30 min. The compound of formula 3 in THF solution (4.6 g, 5 mL) was added dropwise, and the reaction was continued for 30 min. The reaction was monitored by TLC. After completion, 20 mL saturated NHCl4 solution was added dropwise, then 30 mL ethyl acetate was added for extraction. The organic phase was concentrated under reduced pressure. The compound of the title formula 4 was purified by column chromatography to give 5.3 g as an oil.

Synthesis of Compounds of Formula 5

Compound of formula 4 (3.0 g) was dissolved in ethyl acetate (30 mL), and tetrabutylammonium fluoride (6 ml, 1M THF solution) was added. The reaction was stirred at room temperature for 30 min. Then 30 mL of water was added. The organic phase was extracted and concentrated to give the compound of Formula 5 (1.5 g) as an oil.

Synthesis of Compounds of Formula 6

Dissolve the compound of Formula 5 (1.5 g) in dichloromethane, add trifluoroacetic acid (0.1 g) and Pd/C (10%, 0.15 g). The reaction was stirred under $H_2$ at room temperature overnight to give title compound of Formula 6. HNMR (DMSO-d6, 400 MHz) δ: 8.96 (s, 1H), 6.92 (d, 1H), 6.85 (d, 1H)1, 6.60 (S, 1H), 6.45 (s, 2H), 5.11 (s, 2H), 3.79 (s, 2H), 3.17~3.25 (m, 1H), 2.08 (s, 6H), 1.10 (d, 6H).

Synthesis of Compounds of Formula 8

Compound of Formula 6 (11 g), compound of Formula 7 (11.3 g) and cesium carbonate (17.0 g) were dissolved in acetonitrile (50 mL) and heated to 65° C. overnight. The reaction was monitored by TLC. The reaction solution is cooled to room temperature, Filtered and concentrated to dryness. The title compound of formula 8 was purified by column chromatography to give target as an oil (12 g). 1HNMR (DMSO-d6, 400 MHz) δ: 6.93 (d, 1H), 6.85 (d, 1H), 6.62 (s, 1H), 6.47 (S, 2H), 5.15 (s, 2H), 4.45 (m, 2H), 4.01~4.06 (m, 4H), 3.81 (s, 2H), 3.31 (s, 3H), 3.16~3.25 (m, 1H), 2.08 (s, 6H), 1.19 (d, 6H), 1.10 (d, 6H).

Synthesis of Compounds of Formula 9

Compound of Formula 8 (16 g) was dissolved in dichloromethane (100 mL), and trimethylbromosilane (TMSBr) (22.0 g) was added dropwise and react overnight at room temperature. The reaction was monitored by TLC. After completed, 100 ml of water was added. The organic phase was extracted, and concentrated to dryness to give the title compound of Formula 9. 1HNMR (DMSO-d6, 400 MHz) δ:9.05 (s, 1H), 6.93 (d, 1H), 6.85 (d, 1H), 6.62 (S, 1H), 6.47 (s, 2H), 4.45 (m, 2H), 3.81 (s, 2H), 3.16~3.25 (m, 1H), 2.08 (s, 6H), 1.10 (d, 6H).

Synthesis of Compound of Formula (I)

Detection Conditions of High Performance Liquid Chromatography

In this example, high performance liquid chromatography (HPLC) was used to monitor the reaction solution after the end of the reaction, and the HPLC analysis method was as follows:

Chromatographic conditions: $C_{18}$ column (ace ultracore 2.5 superc18 4.6*150 mm); Ultraviolet detector with wavelength of 230 nm; The mobile phase A is 0.05% trifluoroacetic acid aqueous solution;

The mobile phase B is acetonitrile; The flow rate is 1.0 ml/min; Sample injection amount is 5 μl; The diluent is acetonitrile; Column temperature is 45° C.; Running time is 20 min; The post-operation time is 5 min. Gradient elution was carried out according to Table 1 below.

TABLE 1

| | Gradient elution | |
|---|---|---|
| Time (min) | Mobile phase A(%) | Mobile phase B(%) |
| 0.00 | 50 | 50 |
| 0.20 | 50 | 50 |
| 3.00 | 35 | 65 |
| 8.00 | 35 | 65 |

TABLE 1-continued

Gradient elution

| Time (min) | Mobile phase A(%) | Mobile phase B(%) |
|---|---|---|
| 10.00 | 0 | 100 |
| 20.00 | 0 | 100 |

Synthetic Method

Compound of Formula 9 (1.4 g) was dissolved in dichloromethane (14 ml) and DMF (28 mg, 0.1 Eq.), SOCl$_2$ (0.82 g, 2.5 eq.) was added. Then the mixture was heated to reflux overnight. The reaction solution is concentrated to dryness to give phosphonyl chloride intermediate 11 as an oil, which was dissolved in 14 mL methylene chloride for later use. Compound of formula 10 (0.717 g, 1.0 eq.) was dissolve in 10 ml dichloromethane, add TiCl$_4$ (0.73 g, 1.0 eq.) at 0~10° C. After the addition, triethylamine (1.56 g, 4.0 eq.) was added and the mixture was maintained for 10 min. The resulting solution was added dropwise to the solution of phosphonyl chloride intermediate of Formula 11 at −30° C., and maintained for 2 hours. After the reaction was completed by TLC monitor. HPLC showed cis:trans≈5.5:1 in the reaction solution. The reaction solution was quenched with 10 ml water. The organic phase was concentrated to dryness to give the target compound of Formula I by column chromatography (1.25 g, yield: 62.5%). 1HNMR (400 MHz, DMSO-d) δ ppm 1.10 (d, J=6.85 Hz, 6H), 2.17 (s, 6H), 2.19-2.28 (m, 2H), 3.13 (m, 1H), 3.82 (S, 2H), 4.39-4.46 (m, 1H), 4.46-4.52 (m, 2H), 4.56-4.64 (m, 1H), 5.76 (Br d, J=10.03 Hz, 1H), 6.42-6.51 (m, 1H), 6.62 (d, J=8.19 Hz, 1H), 6.68-6.80 (m, 2H), 6.80-6.88 (m, 1H), 7.33-7.42 (m, 3H), 7.50 (s, 1H), 8.98 (s, 1H)

Example 2

Compound of formula 9 (1.4 g) was dissolved in dichloromethane (14 ml) and DMF (140 mg, 0.5 eq.), SOCl$_2$ (1.64 g, 5.0 eq.) was added. Then the mixture was heated to reflux overnight. The reaction solution is concentrated to dryness to give phosphonyl chloride intermediate 11 as an oil, which was dissolved in 14 mL methylene chloride for later use. Compound of formula 10 (0.86 g, 1.2 eq.) was dissolve in 10 ml dichloromethane, add TiCl$_4$ (1.09 g, 1.5 eq.) at −10° C. After the addition, triethylamine (3.11 g, 8 eq.) was added and the mixture was maintained for 10 min at −20~10° C. The resulting solution was added dropwise to the solution of phosphonyl chloride intermediate 11 at −20° C., and maintained for 2 hours. After the reaction was completed by TLC monitor. HPLC showed cis:trans≈3:1 in the reaction solution. The reaction solution was quenched with 10 ml water. The organic phase was concentrated to dryness to give the target compound of Formula I by column chromatography (1.1 g, yield: 55%).

Example 3

Compound of formula 9 (1.4 g) was dissolved in dichloromethane (14 ml) and DMF (56 mg, 0.2 eq.), SOCl$_2$ (0.82 g, 2.5 eq) was added. Then the mixture was heated to reflux overnight. The reaction solution is concentrated to dryness to give phosphonyl chloride intermediate 11 as an oil, which was dissolved in 14 mL methylene chloride for later use. Compound of formula 10 (0.86 g, 1.2 eq.) was dissolve in 10 ml dichloromethane, add TiCl$_4$ (0.874 g, 1.2 eq.) at 0~5° C. After the addition, triethylamine (0.78 g, 2 eq.) was added and the mixture was maintained for 10 min. The resulting solution was added dropwise to the solution of phosphonyl chloride intermediate 11 at 0° C., and maintained for 2 hours. After the reaction was completed by TLC monitor. HPLC showed cis:trans≈3.2:1 in the reaction solution. The reaction solution was quenched with 10 ml water. The organic phase was concentrated to dryness to give the target compound of Formula I by column chromatography (1.05 g, yield: 53%).

Example 4

Compound of Formula 9 (1.4 g) was dissolved in dichloromethane (14 ml) and DMF (5.6 mg, 0.02 eq.), SOCl$_2$ (0.82 g, 2.5 eq.) was added. Then the mixture was heated to reflux overnight. The reaction solution is concentrated to dryness to give phosphonyl chloride intermediate 11 as an oil, which was dissolved in 14 mL methylene chloride for later use. Compound of formula 10 (0.72 g, 1.0 eq.) was dissolve in 10 ml dichloromethane, add TiCl$_4$ (0.874 g, 1.2 eq.) at 10~15° C. After the addition, triethylamine (0.97 g, 2.5 eq.) was added at 0~5° C. and the mixture was maintained for 20 min. The resulting solution was added dropwise to the solution of phosphonyl chloride intermediate of Formula 11 at −40° C., and maintained for 2 hours. After the reaction was completed by TLC monitor. HPLC showed cis:trans≈6:1 in the reaction solution. The reaction solution was quenched with 10 ml water. The organic phase was concentrated to dryness to give the target compound of Formula I by column chromatography (1.3 g, yield: 65%).

Example 5

Compound of formula 9 (1.4 g) was dissolved in dichloromethane (14 ml) and DMF (5.6 mg, 0.02 eq.), COCl$_2$ (1.95 g, 4.0 eq.) was added. Then the mixture was heated to reflux overnight. The reaction solution is concentrated to dryness to give phosphonyl chloride intermediate 11 as an oil, which was dissolved in 14 mL methylene chloride for later use. Compound of formula 10 (0.72 g, 1.0 eq.) was dissolve in 10 ml 1,2-dichloroethane, add TiCl$_4$ (0.874 g, 1.2 eq.) at 10~15° C. After the addition, triethylamine (0.97 g, 2.5 eq.) was added at 0~5° C. and the mixture was maintained for 20 min. The resulting solution was added dropwise to the solution of phosphonyl chloride intermediate 11 at −40° C., and maintained for 2 hours. After the reaction was completed by TLC monitoring. HPLC showed cis:trans≈6:1 in the reaction solution. The reaction solution was quenched with 10 ml water. The organic phase was concentrated to dryness to give the target compound of Formula I by column chromatography (1.2 g, yield: 60%).

Example 6

Compound of Formula 9 (1.4 g) was dissolved in dichloromethane (14 ml) and DMF (5.6 mg, 0.02 eq.), triphosgene (2.28 g, 2.0 eq.) was added. Then the mixture was heated to reflux overnight. The reaction solution is concentrated to dryness to give phosphonyl chloride intermediate 11 as an oil, which was dissolved in 14 mL methylene chloride for later use. Compound of formula 10 (0.79 g, 1.1 eq.) was dissolve in 10 ml dichloromethane, add TiCl$_4$ (0.874 g, 1.2 eq.) at 10~15° C. After the addition, triethylamine (2.33 g, 6.0 eq.) was added at 0~5° C. and the mixture was maintained for 20 min. The resulting solution was added dropwise to the solution of phosphonyl chloride intermediate of Formula 11 at −40° C., and maintained for 2 hours. After the reaction was completed by TLC monitor. HPLC showed cis:trans≈6:1 in the reaction solution. The reaction solution was quenched with 10 ml water. The organic phase was concentrated to dryness to give the target compound of Formula I by column chromatography (1.2 g, yield: 60%).

Example 7

Compound of formula 9 (1.4 g) was dissolved in dichloromethane (14 ml) and DMF (5.6 mg, 0.02 eq.), triphosgene (2.28 g, 2.0 eq.) was added. Then the mixture was heated to reflux overnight. The reaction solution is concentrated to dryness to give phosphonyl chloride intermediate 11 as an oil, which was dissolved in 14 mL methylene chloride for later use. Compound of Formula 10 (0.72 g, 1.0 eq.) was dissolve in 10 ml dichloromethane, add $TiCl_4$ (0.874 g, 1.2 eq.) t 0~5° C. After the addition, triethylamine (2.33 g, 6.0 eq.) was added at 0~5° C. and the mixture was maintained for 20 min. The resulting solution was added dropwise to the solution of phosphonyl chloride intermediate of Formula 11 at −10° C., and maintained for 2 hours. After the reaction was completed by TLC monitoring. HPLC showed cis:trans≈2.8:1 in the reaction solution. The reaction solution was quenched with 10 ml water. The organic phase was concentrated to dryness to give the target compound of Formula I by column chromatography (1.05 g, yield: 53%).

Example 8

Compound of formula 9 (1.4 g) was dissolved in dichloromethane (14 ml) and DMF (5.6 mg, 0.02 eq.), $SOCl_2$ (0.82 g, 2.5 eq.) was added. Then the mixture was heated to reflux overnight. The reaction solution is concentrated to dryness to give phosphonyl chloride intermediate 11 as an oil, which was dissolved in 14 mL methylene chloride for later use. Compound of formula 10 (0.72 g, 1.0 eq.) was dissolve in 10 ml dichloromethane, add $FeCl_3$ (1.25 g, 2.0 eq.) at 10~15° C. After the addition, triethylamine (0.97 g, 2.5 eq.) was added at 0~5° C. and the mixture was maintained for 20 min. The resulting solution was added dropwise to the solution of phosphonyl chloride intermediate 11 at −50° C., and maintained for 2 hours. After the reaction was completed by TLC monitoring. HPLC showed cis:trans≈7:1 in the reaction solution. The reaction solution was quenched with 10 ml water. The organic phase was concentrated to dryness to give the target compound of Formula I by column chromatography (0.9 g, yield: 45.5%).

In this example, the last condensation reaction was carried out at −50° C., which resulted in incomplete reaction and starting materials were not completely converted into products. Therefore, although HPLC shows a high proportion of cis products, the final yield of targeted Formula I compound did not increase correspondingly.

Example 9

Compound of formula 9 (1.4 g) was dissolved in dichloromethane (14 ml) and DMF (140 mg, 0.5 eq.), $SOCl_2$ (1.64 g, 5.0 eq.) was added. Then the mixture was heated to reflux overnight. The reaction solution is concentrated to dryness to give phosphonyl chloride intermediate 11 as an oil, which was dissolved in 14 mL methylene chloride for later use. Compound of formula 10 (0.86 g, 1.2 eq.) was dissolve in 10 ml dichloromethane, add $TiCl_4$ (1.25 g, 2.0 eq.) at −10° C. After the addition, triethylamine (1.56 g, 4 eq.) was added at −20~10° C. and the mixture was maintained for 20 min. The resulting solution was added dropwise to the solution of phosphonyl chloride intermediate 11 at −40° C., and maintained for 2 hours. After the reaction was completed by TLC monitoring. HPLC showed cis:trans≈6:1 in the reaction solution. The reaction solution was quenched with 10 ml water. The organic phase was concentrated to dryness to give the target compound of Formula I by column chromatography (1.3 g, yield: 65%).

Example 10

Compound of formula 9 (1.4 g) was dissolved in dichloromethane (14 ml) and DMF (140 mg, 0.5 eq.), $SOCl_2$ (1.64 g, 5.0 eq.) was added. Then the mixture was heated to reflux overnight. The reaction solution is concentrated to dryness to give phosphonyl chloride intermediate 11 as an oil, which was dissolved in 14 mL methylene chloride for later use. Compound of formula 10 (0.86 g, 1.2 eq.) was dissolve in 10 ml dichloromethane, add $TiCl_4$ (1.09 g, 1.5 eq.) at −10° C. After the addition, triethylamine (1.56 g, 4 eq.) was added at −20~10° C. and the mixture was maintained for 10 min. The resulting solution was added dropwise to the solution of phosphonyl chloride intermediate 11 at −35° C., and maintained for 2 hours. After the reaction was completed by TLC monitoring. HPLC showed cis:trans≈5.7:1 in the reaction solution. The reaction solution was quenched with 10 ml water. The organic phase was concentrated to dryness to give the target compound of Formula I by column chromatography (1.2 g, yield: 60%).

Example 11

Compound of formula 9 (673 g) was dissolved in dichloromethane (4.139 Kg) and DMF (0.005 Kg, 0.04 eq.), $SOCl_2$ (0.949 Kg) was added. Then the mixture was heated to 35-45° C. for 4-6 h. The reaction solution is concentrated to dryness under reduced pressure at 10-30° C. to give phosphonyl chloride intermediate 11 as an oil, which was dissolved in methylene chloride (6.912 Kg) for later use. Compound of formula 10 (415 g, 1.2 eq.) was dissolve in dichloromethane (9.22 Kg), add $TiCl_4$ (424 g, 1.2 eq.) at −15~−5° C. After the addition, triethylamine (471 g, 2.6 eq.) was added at −15~−5° C. and the mixture was maintained for 0.5-1.5 h. The resulting solution was added dropwise to the solution of phosphonyl chloride intermediate 11 at −60~−40° C., and maintained for 3-6 hours. After the reaction was completed by HPLC monitoring, the reaction solution was quenched with water (1.467 Kg). Then anhydrous Na2SO4 (4.657 Kg) and dichloromethane (3.483 Kg) was added and stirred for 30-40 min. The organic phase was washed with brine twice and concentrated under reduced pressure at 25-35° C. to dryness to give the crude compound of Formula I, which was purified by column chromatography (200-300 mesh) to give solvate target compound. The solvate compound was purified further by recrystallization from EtOAc/MTBE/n-heptane and EtOAc/MTBE successively to give MTBE solvate compound. The MTBE was substituted by EtOH under reduced pressure to give pure product (695 g, yield: 75%).

Example 12

Single X-Ray Diffraction

XtaLAB Synergy (007 Mo). Instrument: micro focal spot rotating target single crystal x-ray diffractometer, XtaLAB Synergy (007 Mo).

Single crystal culture method: put 1.0 g of the compound of Formula (I) obtained in Examples 1-10 with purity higher than 99.0% into a 50 ml sample bottle, dissolve it in 10 ml of ethyl acetate, add 10 ml of methyl tert-butyl ether to get a clear solution. Then loosen the bottle mouth, and put it in a thermostat at 20° C. for 10 days to obtained the single crystal.

The x-ray single crystal diffraction pattern shown in FIG. 1 is obtained by single crystal x-ray diffractometer detection. The obtained single crystal is the compound of Formula (I) with 1-methyl tert-butyl ether solvate. The stereo center of C7 and P1 in FIG. 1 is consistent with the compound in Formula I.

The test results are shown in Table 2.

TABLE 2

Determination of crystal data and structural details

| | |
|---|---|
| Chemical formula | $C_{28}H_{32}ClO_5P$ |
| Molecular weight | 514.98 |
| Syngony | Monoclinal |
| Space group | p2(1) |
| a, b, c (Å) | 12.219(2), 9.490(1), 15.112(1) |
| A, b, c (Å) | |
| β(°) | 110.401(10) |
| V (Å3) | 1642.5(3) |
| V (Å3) | |
| Z | 19 |
| D(calc) (g/cm$^3$) | 1.833 |
| μ(MoK α) (mm$^{-1}$) | 1.310 |
| Scan mode | φ and ω scanning |
| F(000) | 893 |
| Grain size of crystal (mm) | 0.08 × 0.12 × 0.15 |
| θ Range | 2.58 To 30.74 |
| The limiting indicators (limiting indicators) | −15<h<15, −12<k<12, −18<l<20 |
| Flack parameter | 0.07(12) |
| Tot. , Uniq. Data, R(int) | 15093, 7423, 0.069 |
| Observed data I>2 σ(I) | 4390 |
| R, wR$_2$ | 0.0910, 0.2584 |
| S | 1.422 |
| Max., Av. Shift/error | 0.265, 0.014 |

Comparative Example 1

Compound of Formula 9 (1.20 g), dicyclohexylcarbodiimide (DCC) (2.03 g), pyridine (5.72 g) and N,N-dimethylformamide (6 ml) were added to a 25 ml reaction flask and stirred at room temperature for 10 minutes. Compound of Formula 10 (0.62 g) was added dropwise and heated to 65° C. After the reaction, 1 ml water was added to quench the reaction, and 20 ml dichloromethane was added to extract the reaction. The extract was detected by HPLC and showed that cis:trans≈1.7:1. Compound of Formula I was obtained by column chromatography (0.25 g, yield: 15%).

In this example, the compound of Formula I was prepared by the method disclosed in Example 13 of patent application WO2006128055. Similar to the results disclosed in this patent application, the stereoselectivity of the cis product generated by the reaction was poor and the yield was low.

Comparative Example 2

The compound of Formula I was prepared according to the method of Comparative Example 1, in which the reactant compound of Formula 9, Formula 10, condensing agents and organic bases, and the specific experimental results are shown in Table 3.

TABLE 3

| Compound of Formula 9 | Compound of Formula 10 | Condensating agent | Organic base | Reaction condition |
|---|---|---|---|---|
| 100 mg | 51 mg | T3P: 270 mg | Triethylamine: 690 mg | Cis: trans ≈ 1.4: 1; Yield: 12% |
| 100 mg | 51 mg | DCC: 170 mg | Pyridine: 540 mg | Cis: trans ≈ 1.6: 1; Yield: 17% |
| 100 mg | 51 mg | DCC: 170 mg DMAP: 10 mg | Pyridine: 540 mg | Cis: trans ≈ 1.5: 1; Yield: 15% |
| 100 mg | 51 mg | DCC: 170 mg | DIEA: 690 mg | Cis: trans ≈ 1.6: 1; Yield: 16% |

In this comparative example, the type and amount of condensing agent and organic base were changed, and the compound of Formula I was prepared by the method of comparative example 1. However, similar to the results of Comparative Example 1, the stereoselectivity of cis products produced by the reaction is poor and the yield is low.

Comparative Example 3

Compound of Formula 9 (1.4 g) was dissolved in dichloromethane (14 ml) and DMF (140 mg, 0.5 eq.), $SOCl_2$ (0.82 g, 2.5 eq.) was added. Then the mixture was heated to reflux overnight. The reaction solution is concentrated to dryness to give phosphonyl chloride intermediate 11 as an oil, which was dissolved in 14 mL methylene chloride for later use. Compound of formula 10 (0.72 g, 1.0 eq.) was dissolve in 10 ml dichloromethane, add $AlCl_3$ (1.03 g, 2.0 eq.) at 10-15° C. After the addition, triethylamine (1.56 g, 4 eq.) was added at 0~5° C. and the mixture was maintained for 20 min. The resulting solution was added dropwise to the solution of phosphonyl chloride intermediate 11 at −40° C., and maintained for 2 hours. After the reaction was completed by TLC monitoring. HPLC showed cis:trans≈1.4:1 in the reaction solution. The reaction solution was quenched with 10 ml water. The organic phase was concentrated to dryness to give the target compound of Formula I by column chromatography (0.1 g, yield: 5%).

In this comparative example, the type of Lewis acid was changed, $AlCl_3$ was used instead of the present invention. $TiCl_4$, $SnCl_4$ and/or $FeCl_3$, however, the selectivity and yield of cis products are poor. It can be seen that for preparing the cyclic phosphonate compound shown in Formula 1 of the present invention, the type of Lewis acid has a great influence on the stereoselectivity and yield of the reaction.

While various embodiments have been described above, it should be understood that such disclosures have been presented by way of example only and are not limiting. Thus, the breadth and scope of the subject compositions and methods should not be limited by any of the above-described exemplary embodiments, but should be defined only in accordance with the following claims and their equivalents.

The above description is for the purpose of teaching the person of ordinary skill in the art how to practice the present invention, and it is not intended to detail all those obvious modifications and variations of it which will become apparent to the skilled worker upon reading the description. It is intended, however, that all such obvious modifications and variations be included within the scope of the present invention, which is defined by the following claims. The claims are intended to cover the components and steps in any sequence which is effective to meet the objectives there intended, unless the context specifically indicates the contrary.

What is claimed is:

1. A method for preparing a cyclic phosphonate compound shown in Formula I,

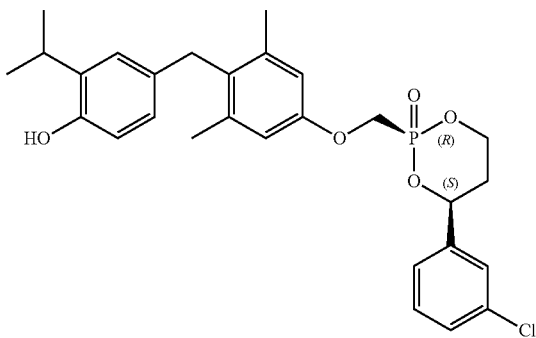

comprising the steps of:
(1) reacting a compound of Formula 9 with a chlorinating agent to obtain a phosphonyl chloride intermediate of Formula 11,

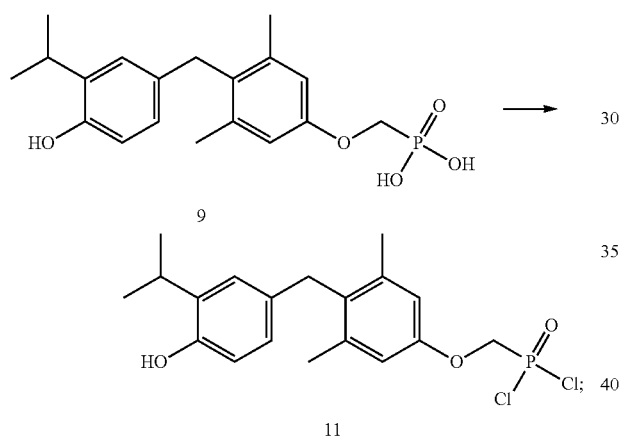

and dissolving the phosphonyl chloride intermediate of Formula 11 in a first organic solvent to form a solution of Formula 11;
(2) dissolving a compound of Formula 10 in a second organic solvent to form a solution of Formula 10

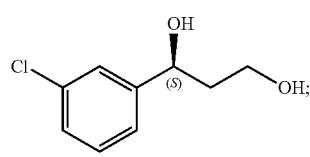

adding sequentially a Lewis acid and then an alkali to the solution of Formula 10 to form a reaction solution, wherein the Lewis acid is selected from the group consisting of TiCl$_4$, SnCl$_4$, FeCl$_3$ and combinations thereof; and
(3) adding the reaction solution of step (2) into the solution of Formula 11 to produce the cyclic phosphonate compound of Formula I.

2. The method of claim 1, wherein the first and the second organic solvent are selected from the group comprising dichloromethane, 1,2-dichloroethane and tetrahydrofuran, and
wherein the chlorinating agent is selected from the group comprising thionyl chloride, oxalyl chloride and triphosgene.

3. The method of claim 1, wherein the molar ratio of chlorinated reagent to compound of Formula 9 in step (1) is in the range of 2:1 to 6:1.

4. The method of claim 1, wherein the molar ratio of the compound of Formula 10 to the compound of Formula 9 in step (3) is in the range of 1.0:1-1.2:1.

5. The method of claim 1, wherein the molar ratio of the Lewis acid to the compound of Formula 10 in step (2) is in the range of 1:1 to 2:1.

6. The method of claim 1, wherein the alkali is an organic base.

7. The method of claim 6, wherein the organic base is trimethylamine.

8. The method of claim 7, wherein the molar ratio of triethylamine to the compound Formula 10 in step (2) is in the range of 1.5:1 to 8:1.

9. The method of claim 1, wherein the chlorinating reagent is dripped into the solution of compound of Formula 9 at 15-25° C., and reacted with the compound of Formula 9 at 35-85° C. in step (1).

10. The method of claim 1, wherein the Lewis acid is added dropwise to the solution of Formula 10 at −10° C. to 15° C. to form a first mixture, and then the alkali is added to the first mixture dropwise at −20° C. to 10° C. to form a second mixture, the second mixture is stirred for 10-60 minutes to form the reaction solution of step (2).

11. The method of claim 1, wherein the reaction solution of step (2) is added dropwise into the solution of Formula 11 at −50° C. to 0° C., and is stirred at −50° C. to 0° C. to form the compound of Formula I.

12. The method of claim 1, wherein the reaction solution of step (2) is added dropwise into the solution of Formula 11 at −40° C. to −30° C., and stirred at −40 to −30° C. to form the compound of Formula I.

13. The method of claim 1, wherein the compound of Formula 9 reacts with the chlorinating agent in the presence of N,N-dimethylformamide in step (1).

14. The method of claim 13, wherein the molar ratio of the N,N-dimethylformamide to the compound of Formula 9 is in the range of 0.02:1-0.5:1.

* * * * *